United States Patent
White (10) Patent No.: US 11,227,087 B1
(45) Date of Patent: Jan. 18, 2022

(54) SYSTEM, METHOD, AND COMPUTER PROGRAM PRODUCT FOR DISTRIBUTED LEARNING IN AN ELECTRONIC DESIGN

(71) Applicant: Cadence Design Systems, Inc., San Jose, CA (US)

(72) Inventor: David Allan White, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 576 days.

(21) Appl. No.: 16/240,377

(22) Filed: Jan. 4, 2019

(51) Int. Cl.
| | |
|---|---|
| *G06F 30/33* | (2020.01) |
| *G06K 9/62* | (2006.01) |
| *G06Q 10/10* | (2012.01) |
| *G06N 20/00* | (2019.01) |
| *H04L 29/08* | (2006.01) |
| *H04L 29/06* | (2006.01) |
| *G06F 30/392* | (2020.01) |
| *G06F 30/394* | (2020.01) |
| *G06F 30/398* | (2020.01) |
| *G06F 111/02* | (2020.01) |

(52) U.S. Cl.
CPC ............ *G06F 30/33* (2020.01); *G06F 30/392* (2020.01); *G06F 30/394* (2020.01); *G06F 30/398* (2020.01); *G06K 9/6257* (2013.01); *G06N 20/00* (2019.01); *G06Q 10/103* (2013.01); *H04L 63/0428* (2013.01); *H04L 67/34* (2013.01); *G06F 2111/02* (2020.01)

(58) Field of Classification Search
CPC ..... H04L 67/34; H04L 63/0428; G06F 30/33; G06F 30/392; G06F 30/398; G06F 30/394; G06N 20/00; G06Q 10/103; G06K 9/6257
See application file for complete search history.

(56) References Cited

U.S. PATENT DOCUMENTS

| | | | | |
|---|---|---|---|---|
| 8,793,627 | B1* | 7/2014 | Stephens | G06F 30/398 716/52 |
| 2006/0208169 | A1* | 9/2006 | Breed | G06K 9/00624 250/221 |
| 2006/0291656 | A1* | 12/2006 | Dalmases | H04L 27/2613 380/268 |
| 2015/0381649 | A1* | 12/2015 | Schultz | H04L 63/1433 726/25 |
| 2019/0012592 | A1* | 1/2019 | Beser | G06N 3/0454 |
| 2019/0229105 | A1* | 7/2019 | Tucker | G06F 30/392 |

\* cited by examiner

*Primary Examiner* — El Hadji M Sall
(74) *Attorney, Agent, or Firm* — Mark H. Whittenberger, Esq.; Holland & Knight LLP (57) ABSTRACT

The present disclosure relates to embodiments for collaborative electronic design. Embodiments may include receiving a baseline model at a computing device associated with each of a plurality of geographically dispersed electronic design teams. Embodiments may further include applying environmental data from each of the plurality of geographically dispersed electronic design teams to the baseline model. Embodiments may also include generating a plurality of training changes, based upon, at least in part, the applied environmental data from each of the plurality of geographically dispersed electronic design teams. Embodiments may also include encrypting the plurality of training changes to create a plurality of encrypted training changes. Embodiments may further include providing the plurality of encrypted training changes to a centralized host configured to aggregate the plurality of encrypted training changes.

20 Claims, 6 Drawing Sheets

┌──────────────────────────────────────────────────────────┐
          │ receiving a baseline model at each of a plurality of      │
          │ geographically dispersed electronic design teams          │
          └──────────────────────────────────────────────────────────┘
      202 ⤴
                                      ↓
          ┌──────────────────────────────────────────────────────────┐
          │ applying environmental data from each of the plurality of │
          │ geographically dispersed electronic design teams to the   │
          │ baseline model                                            │
          └──────────────────────────────────────────────────────────┘
      204 ⤴
                                      ↓
          ┌──────────────────────────────────────────────────────────┐
          │ generating a plurality of training changes, based upon,   │
          │ at least in part, the applied environmental data from     │
          │ each of the plurality of geographically dispersed          │
          │ electronic design teams                                   │
          └──────────────────────────────────────────────────────────┘
      206 ⤴
                                      ↓
          ┌──────────────────────────────────────────────────────────┐
          │ encrypting the plurality of training changes to create a  │
          │ plurality of encrypted training changes                   │
          └──────────────────────────────────────────────────────────┘
      208 ⤴
                                      ↓
          ┌──────────────────────────────────────────────────────────┐
          │ providing the plurality of encrypted training changes to  │
          │ a centralized host configured to aggregate the plurality  │
          │ of encrypted training changes                             │
          └──────────────────────────────────────────────────────────┘
      210 ⤴
```

SYSTEM, METHOD, AND COMPUTER PROGRAM PRODUCT FOR DISTRIBUTED LEARNING IN AN ELECTRONIC DESIGN

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic designs, and more specifically, to a method for applying collaborative machine learning techniques to electronic designs.

DISCUSSION OF THE RELATED ART

In the world of electronic design automation ("EDA"), many different approaches have been used in order to physically design or verify the operation of an integrated circuit ("IC") or circuit design. Designers may have design data that is sparsely distributed among numerous companies and teams within those companies. Most of these companies fiercely protect this design data behind secure firewalls. Machine learning may use this data to create models to improve automation, accuracy of results or performance. Generally with more data, the designers want baseline models that provide immediate value, however, their companies are not willing to risk their design data being provided to their competition and, as a result, collaborative environments are avoided.

SUMMARY OF DISCLOSURE

In one or more embodiments of the present disclosure, a computer-implemented method for collaborative electronic design is provided. The method may include receiving a baseline model at a computing device associated with each of a plurality of geographically dispersed electronic design teams. The method may further include applying environmental data from each of the plurality of geographically dispersed electronic design teams to the baseline model. The method may also include generating a plurality of training changes, based upon, at least in part, the applied environmental data from each of the plurality of geographically dispersed electronic design teams. The method may also include encrypting the plurality of training changes to create a plurality of encrypted training changes. The method may further include providing the plurality of encrypted training changes to a centralized host configured to aggregate the plurality of encrypted training changes.

One or more of the following features may be included. In some embodiments, the centralized host may be configured to obscure the plurality of encrypted training changes. Providing the plurality of encrypted training changes to the centralized host may be performed without sending design data, design preferences or design analyses from the plurality of geographically dispersed electronic design teams. Generating an updated model at the centralized host may be based upon, at least in part, the plurality of encrypted training changes. The method may further include providing, from the centralized host, the updated model to each of the plurality of geographically dispersed electronic design teams. The environmental data may include one or more of simulation data, floorplanning data, placement data, routing data, finishing data, checking data, and verification data. Generating the plurality of training changes may include generating one or more error gradients.

In one or more embodiments of the present disclosure a computer-readable storage medium having stored thereon instructions, which when executed by a processor result in one or more operations for electronic design verification. Operations may include receiving a baseline model at a computing device associated with each of a plurality of geographically dispersed electronic design teams. Operations may further include applying environmental data from each of the plurality of geographically dispersed electronic design teams to the baseline model. Operations may also include generating a plurality of training changes, based upon, at least in part, the applied environmental data from each of the plurality of geographically dispersed electronic design teams. Operations may also include encrypting the plurality of training changes to create a plurality of encrypted training changes. Operations may further include providing the plurality of encrypted training changes to a centralized host configured to aggregate the plurality of encrypted training changes.

One or more of the following features may be included. In some embodiments, the centralized host may be configured to obscure the plurality of encrypted training changes. Providing the plurality of encrypted training changes to the centralized host may be performed without sending design data, design preferences or design analyses from the plurality of geographically dispersed electronic design teams. Generating an updated model at the centralized host may be based upon, at least in part, the plurality of encrypted training changes. Operations may further include providing, from the centralized host, the updated model to each of the plurality of geographically dispersed electronic design teams. The environmental data may include one or more of simulation data, floorplanning data, placement data, routing data, finishing data, checking data, and verification data. Generating the plurality of training changes may include generating one or more error gradients.

In yet another embodiment of the present disclosure a system for collaborative electronic design is provided. The system may include one or more processors configured to receive a baseline model at a computing device associated with each of a plurality of geographically dispersed electronic design teams. The one or more processors may be configured to apply environmental data from each of the plurality of geographically dispersed electronic design teams to the baseline model. The one or more processors may be further configured to generate a plurality of training changes, based upon, at least in part, the applied environmental data from each of the plurality of geographically dispersed electronic design teams. The one or more processors may be further configured to encrypt the plurality of training changes to create a plurality of encrypted training changes. The system may further include a centralized host configured to receive the plurality of encrypted training changes and to aggregate the plurality of encrypted training changes. The centralized host may be configured to obscure the plurality of encrypted training changes. Providing the plurality of encrypted training changes to the centralized host may be performed without sending design data, design preferences or design analyses from the plurality of geographically dispersed electronic design teams. Generating an updated model at the centralized host may be based upon, at least in part, the plurality of encrypted training changes. The centralized host may be configured to provide the updated model to each of the plurality of geographically dispersed electronic design teams. The environmental data may include one or more of simulation data, floorplanning data, placement data, routing data, finishing data, checking data, and verification data.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of distributed machine learning electronic design process 10, discussed below in further detail, may provide a distributed approach that allows for collaborative electronic circuit model refinement. The machine learning techniques described herein may provide numerous benefits over existing approaches as a centralized, cloud-based system enables the aggregation of design data from multiple companies while also allowing each individual company to maintain control over their particular design knowledge and preferences. Embodiments included herein may apply to electronic design, verification, and other techniques.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

As used in any embodiment herein, the terms "simulation" and "verification" may refer to the concept of testing an electronic design and may include any actions performed by a software or hardware engine.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
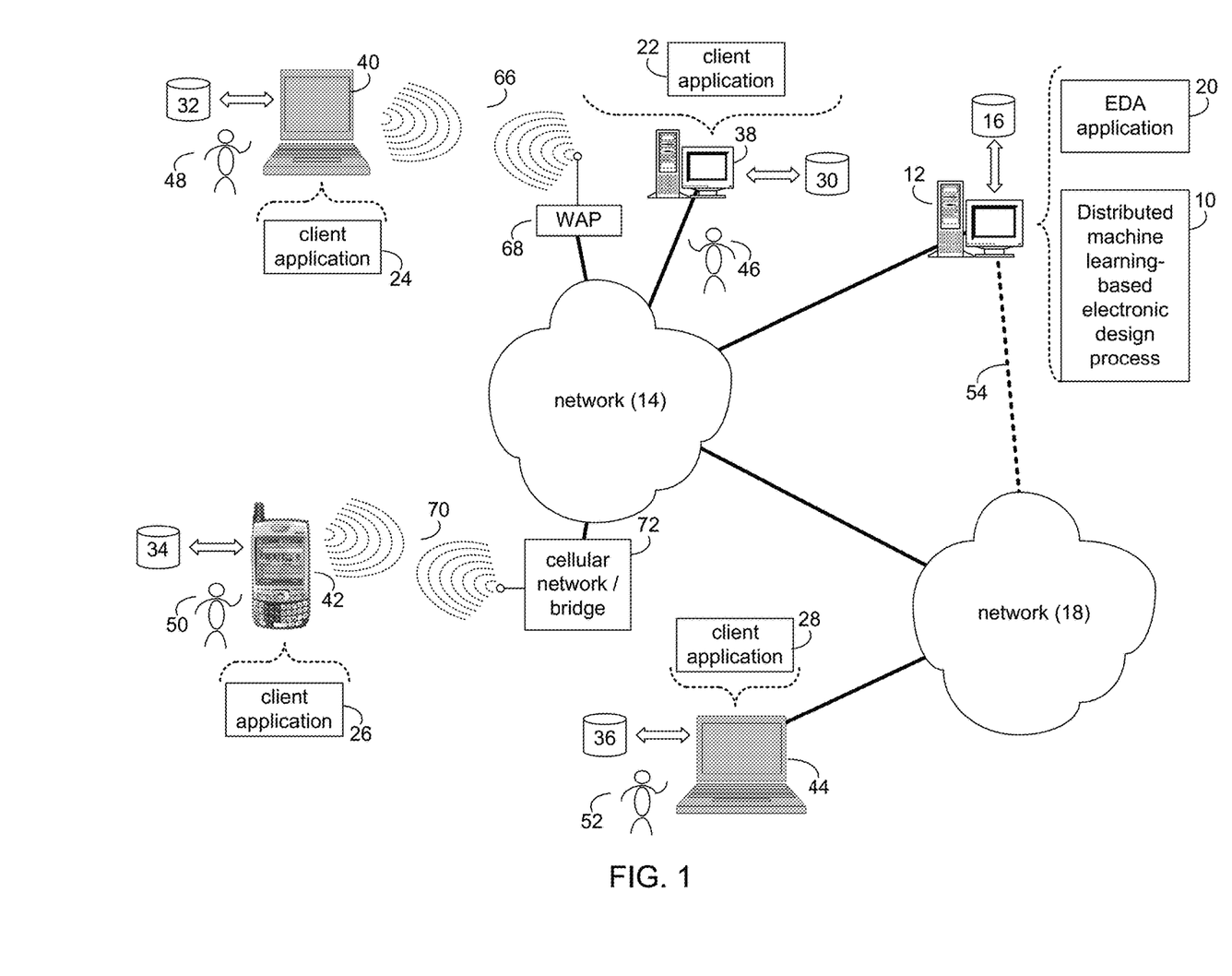
FIG. 1 is a diagram depicting an embodiment of a distributed machine learning electronic design process in accordance with the present disclosure.

Referring to FIG. 1, there is shown a distributed machine learning electronic design process 10 that may reside on and may be executed by server computer 12, which may be connected to network 14 (e.g., the Internet or a local area network, etc.). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, distributed machine learning electronic design process 10 may reside on and be executed, in whole or in part, by a client electronic device, such as a personal computer, notebook computer, personal digital assistant, or the like.

The instruction sets and subroutines of distributed machine learning electronic design process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain, for example, port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Distributed machine learning electronic design process 10 may be a stand alone application, or may be an applet/application/script that may interact with and/or be executed within EDA application 20. In addition/as an alternative to being a server-side process, distributed machine learning electronic design process 10 may be a client-side process (not shown) that may reside on a client electronic device (described below) and may interact with an EDA client application (e.g., one or more of EDA client applications 22, 24, 26, 28). Further, distributed machine learning electronic design process 10 may be a hybrid server-side/client-side process that may interact with EDA application 20 and an EDA client application (e.g., one or more of client applications 22, 24, 26, 28). As such, distributed machine learning electronic design process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize distributed machine learning electronic design process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to iOS™, ANDROID', Microsoft Windows, Microsoft Windows CE®, Red Hat Linux, or other suitable operating system. (Windows CE is a registered trademark of Microsoft Corporation in the United States, other countries, or both).

The term "design" as used herein may refer to, but is not limited to, an integrated circuit design, or any other suitable type of electronic design, such as those associated with electronic design automation tools. For example, an electronic design may refer to a combination of hardware (e.g. described by a hardware description language) and software to implement a range of functions. The function performed by the system may be determined by the way in which the design is configured and the data is presented to the design. Numerous designs may be simulated and any number of engines of various types may be used without departing from the scope of the present disclosure.

In some embodiments, one or more of the designs may be hardware based. Additionally and/or alternatively, one or more of the designs may be software based. For example, the operation of the first design may be a hardware operation and the operation of the second design may be a software operation. Accordingly, distributed machine learning electronic design process 10 may utilize hardware, software and any combination thereof. In some embodiments, hybrid hardware/software engines may be both be used without departing from the scope of the present disclosure.

Figure 2:
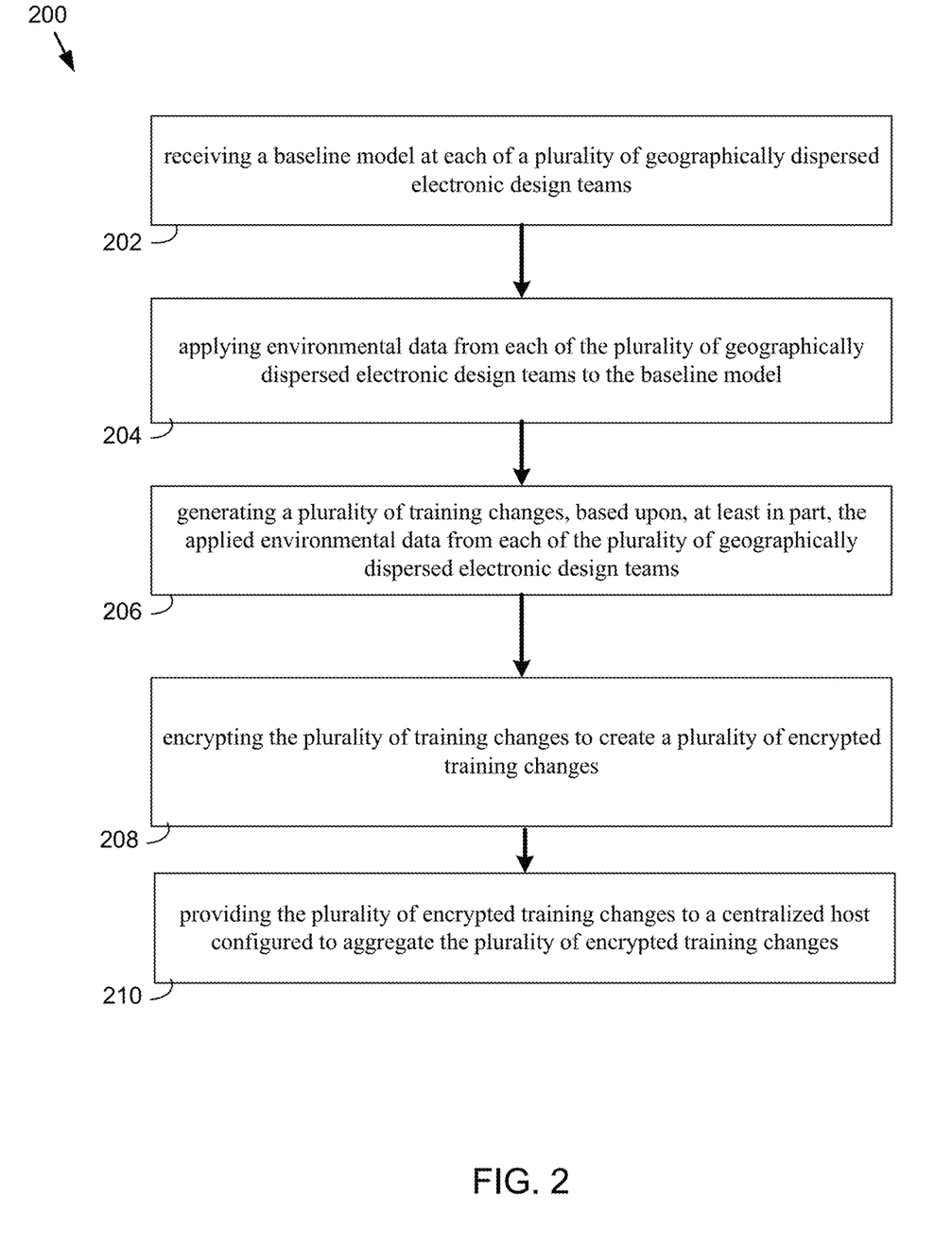
FIG. 2 is a flowchart depicting operations consistent with the distributed machine learning electronic design process in accordance with an embodiment of the present disclosure

Referring now to FIG. 2, a flowchart 200 showing one or more operations consistent with embodiments of distributed electronic design process 10 is provided. The method may include receiving (202) a baseline model at a computing device associated with each of a plurality of geographically dispersed electronic design teams. Embodiments may further include applying (204) environmental data from each of the plurality of geographically dispersed electronic design teams to the baseline machine learning model. Embodiments may also include generating (206) a plurality of training changes, based upon, at least in part, the applied environmental data from each of the plurality of geographically dispersed electronic design teams. Embodiments may also include encrypting (208) the plurality of training changes to create a plurality of encrypted training changes. Embodiments may further include providing (210) the plurality of encrypted training changes to a centralized host configured to aggregate the plurality of encrypted training changes.

Figure 3:
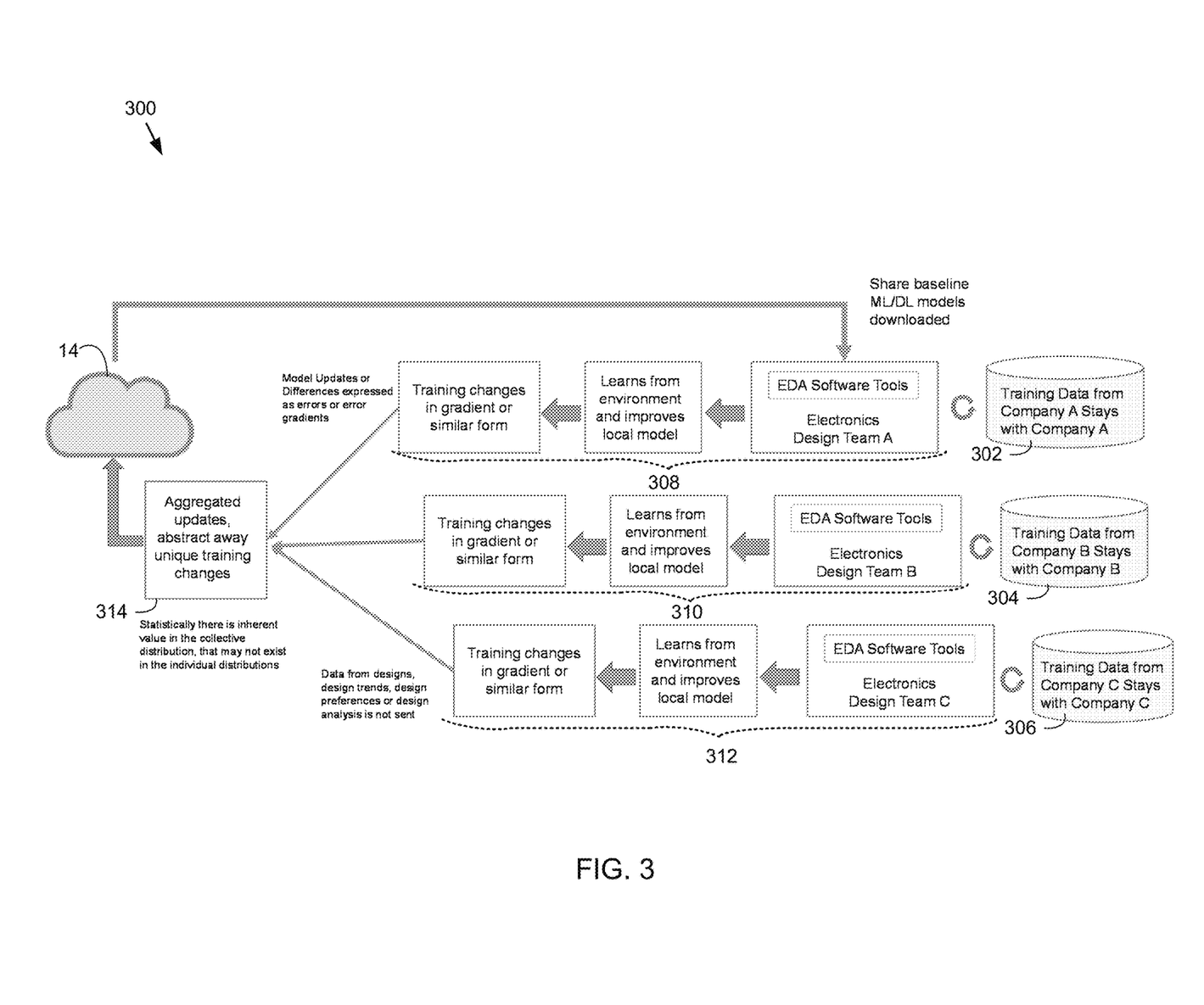
FIG. 3 is a diagram depicting an embodiment of a distributed machine learning electronic design process in accordance with the present disclosure.

Referring now to FIG. 3, a diagram 300 depicting an embodiment consistent with distributed machine learning electronic design process 10 is provided. As discussed above, electronic design data is generally sparsely distributed among teams and/or companies and most companies fiercely protect their data behind secure firewalls. These companies want baseline models that provide immediate value but their companies are not willing to take the risk of their design data/IP being provided to their competition. Accordingly, embodiments of distributed machine learning electronic design process 10 may provide a machine learning approach, which may address these issues and benefit from vast quantities of user-protected data, using a centralized, cloud-based methodology as is depicted in FIG. 3.

In the embodiment of FIG. 3, a distributed machine learning electronic design process 10 is shown that allows for collaborative electronic design model refinement. As shown in the Figure, a distributed, sparse modeling approach may be used to build a collaborative model without transferring any proprietary data. For example, training data 302 from Company A may stay with Company A, training data 304 from Company B may stay with Company B, training data 306 from Company C may stay with Company C, etc. As such, embodiments of distributed machine learning electronic design process 10 may be configured to prevent design knowledge and preferences from ever leaving each individual company. Each of these companies may include their own computing devices or groups of computing devices such as computing devices 38, 40, 42, and 44 shown in FIG. 1 or computing devices 308, 310, 312 shown in FIG. 3, etc. Each of these computing devices may receive a baseline machine learning model and learn from the environment thereby improving the local model associated with each electronic design team. There may be design preferences and trends that influence design intent and there are preferences and trends specific to the types of electronic IC, package and boards being designed. Often a modification may be made based on the mission of the IC, package or board or based on a new or unique characteristics of the silicon technology, node or foundry being used. Accordingly, the baseline model may be adapted for specific design teams, specific types of designs or foundry metal stacks or libraries. Machine and deep learning along with optimization and analytics methods may be used to update or train the models to capture design intent and preferences.

In some embodiments, distributed machine learning electronic design process 10 may be configured to apply environmental data from each of the design teams to the baseline machine learning model and then generate training changes based upon this environmental data. The machine and deep learning models for training may capture sequences of design decisions or may capture parameters related to set-up or configurations for driving these steps. The machine and deep learning models may also capture parameters for configuring the cost functions used to drive the training. The environmental data may be of any suitable form including, but not limited to, simulation data, floorplanning data, placement data, routing data, finishing data, checking data, verification data, etc. Training changes may include modifying models to accommodate a unique or preferred routing topology or placement configuration. Other training changes may include spacing and fill modifications to adapt to new design rules or electrical rules, such as electromigration rules that dictate reliability of the interconnect over time and temperature. Others may include design geometries and preferences that may be discovered during design space searches driven by cost functions such as low power or higher performance.

In some embodiments, distributed machine learning electronic design process 10 may be configured to only provide training changes such as model updates and/or difference calculations back to centralized host 12, 314 that may average and abstract away any specific nature of the data. For example, the training changes may be averaged to capture macro trends and remove specific preferences for a given design team or company. This may serve to anonymize the data to update baseline models that help everyone while not conveying any confidential data. Centralized host 12, 314 may be configured to receive and subsequently aggregate the training changes from each of the companies. These training changes may be encrypted and may take on any suitable form, some of which may include, but are not limited to error calculations, error gradients, etc. Accordingly, distributed machine learning electronic design process 10 may provide encrypted training changes to centralized host 12, 314 without sending design data, design preferences or design analyses from the geographically dispersed electronic design teams associated with each of the companies. The data being encrypted and transferred may represent updates to the weights or coefficients of the models. For example, assuming a linear model that is single input (call it parameter x) and single output (call it parameter y) with data that is used to create it. If we obtain new data that suggests the y-intercept is actually 0.1 higher, then the adjustment to the intercept (a) in y=a bx could be sent for a larger model update without having to send the x, y data that may be highly confidential. For multivariate machine and deep learning, the updates may be far more complex but the concept is similar. It should be noted that the encryption process may occur at each of the company computing devices 308, 310, 312 and/or at centralized host 12, 314.

In some embodiments, centralized host 12, 314 may be configured to receive the training changes (either encrypted or unencrypted) without sending design data, design preferences or design analyses from the individual design teams. Centralized host 314 may be configured to then generate an updated model based upon the plurality of encrypted training changes. Centralized host 12, 314 may then provide the updated model to each of the plurality of geographically dispersed electronic design teams.

Referring again to FIG. 3, an example consistent with embodiments of distributed machine learning electronic design process 10 is provided. In this example, a baseline model for pin to trunk routing may be downloaded from a central server. A local design repository that holds 10 designs from that company may be used to evaluate and tune the model to the design preferences of the design team. Here, the tuning may come from live observations of the designers where the models may be tuned on the fly or in the off-hours where the design may be idle. The model updates, e.g. gradients or weight updates may be aggregated, encrypted and sent back to the cloud or centralized server that would further aggregate them to anonymize the data. The resulting updates would be used to improve the baseline model that could be downloaded as a new baseline improvement.

In some embodiments, distributed machine learning electronic design process 10 may allow multiple companies or research teams to collectively improve design activity in a number of different areas. Some areas may include, but are not limited to, simulation, floorplanning, placement, routing, finishing, checking, verification, or any other suitable area.

Figure 4:
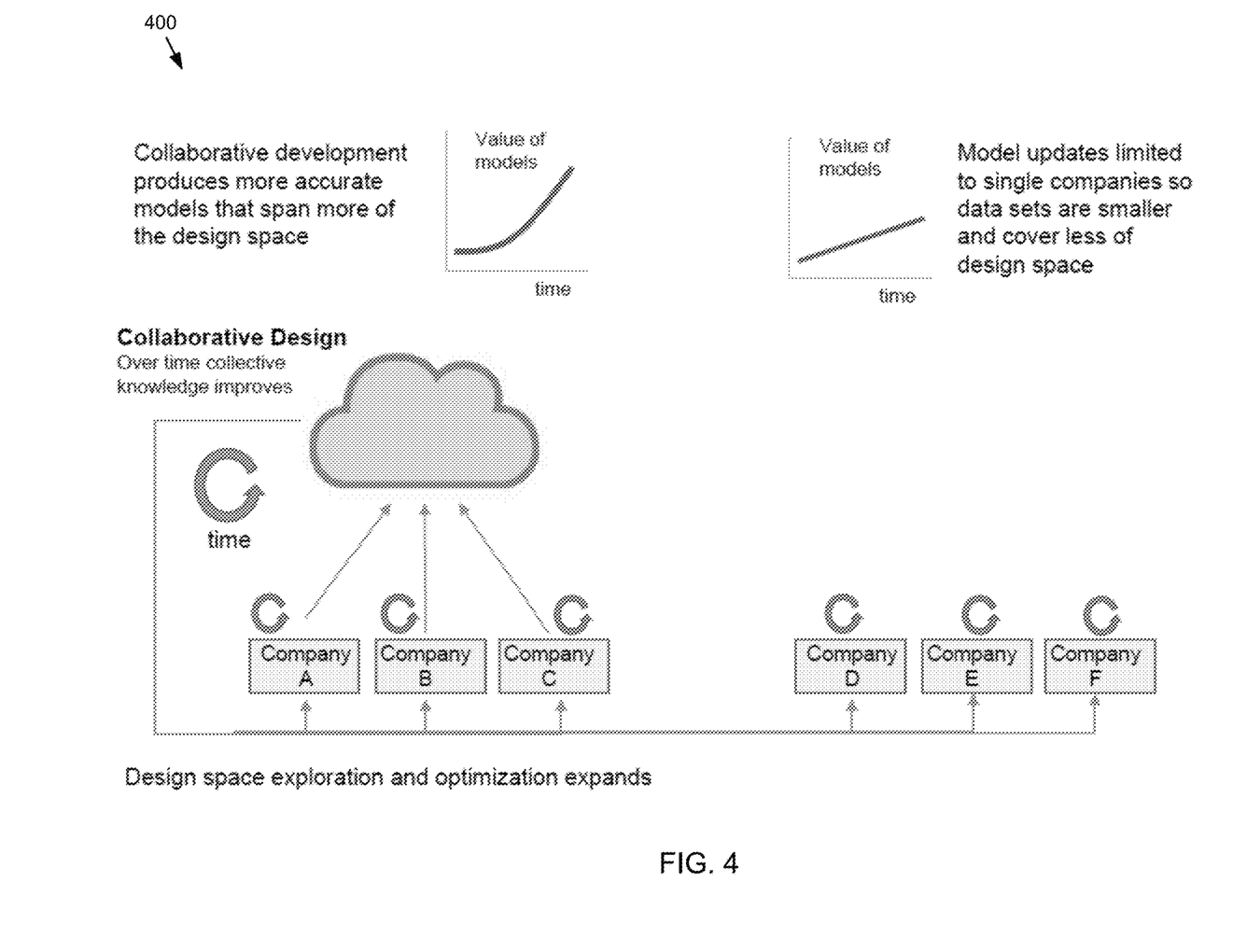
FIG. 4 is a diagram depicting an embodiment of a distributed machine learning electronic design process in accordance with the present disclosure.
Figure 5:
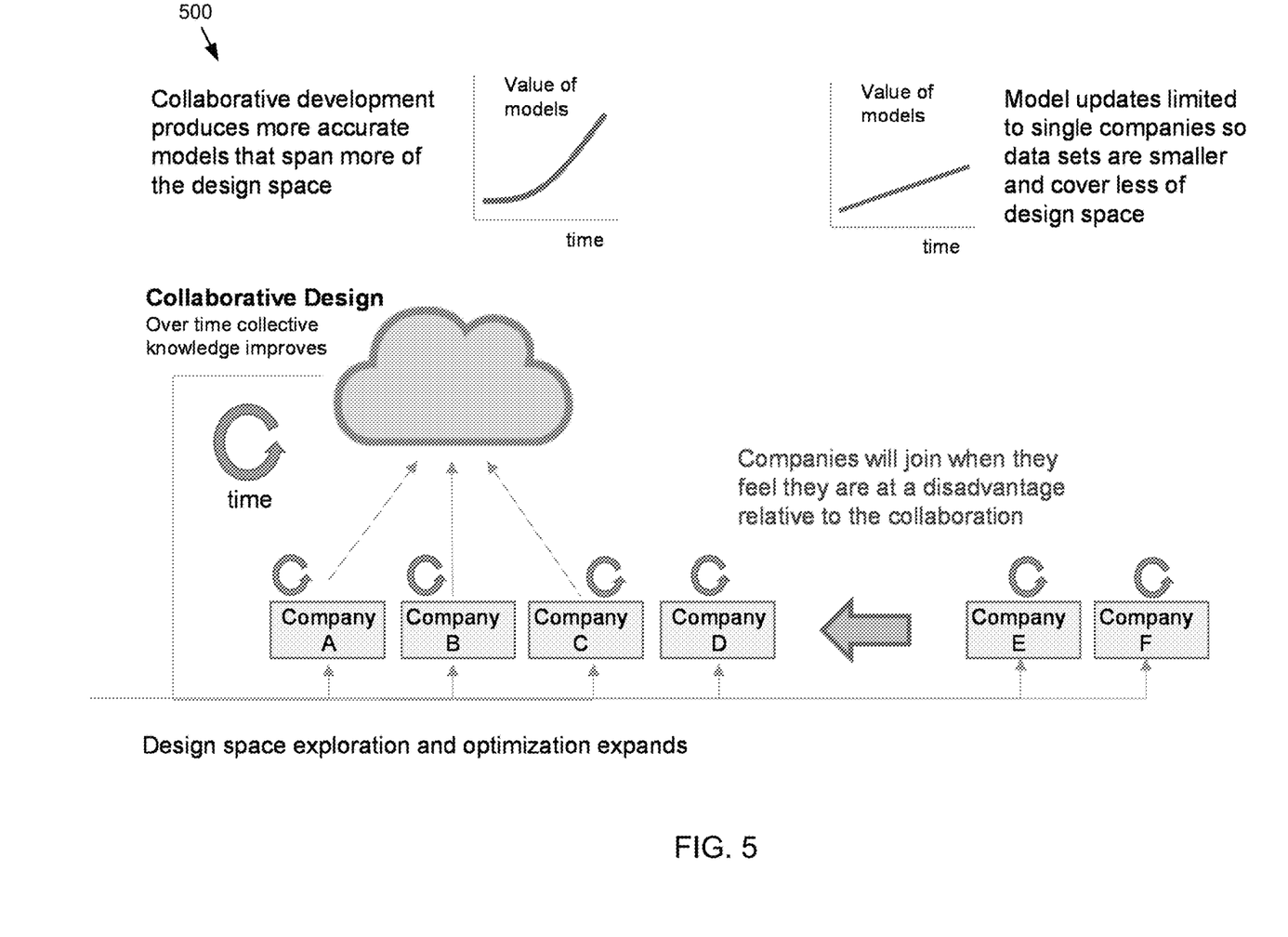
FIG. 5 is a diagram depicting an embodiment of a distributed machine learning electronic design process in accordance with the present disclosure.
Figure 6:
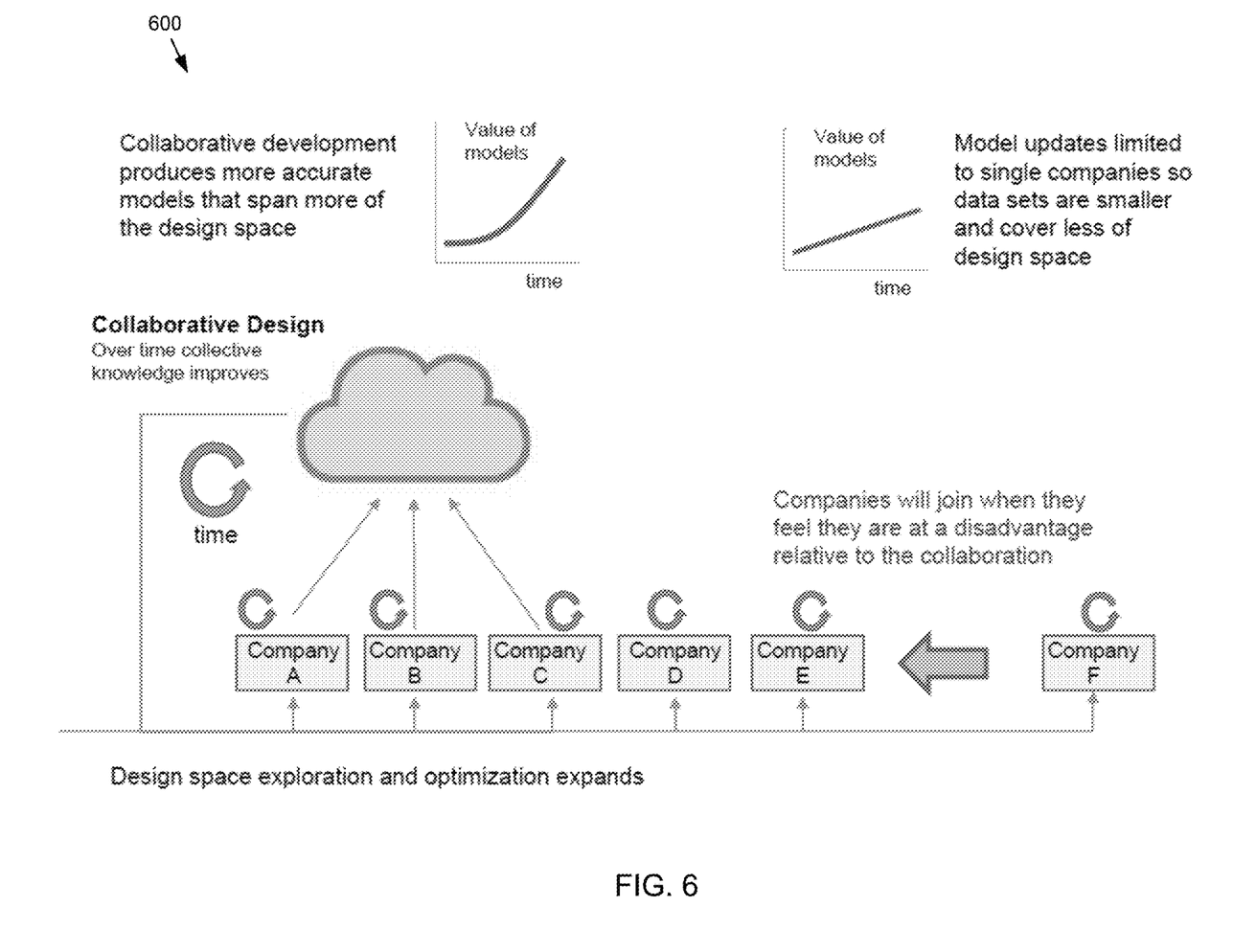
FIG. 6 is a diagram depicting an embodiment of a distributed machine learning electronic design process in accordance with the present disclosure.

Referring also to FIGS. 4-6, embodiments of distributed machine learning electronic design process 10 that show the improving value of a particular model over time are provided. Using this approach, potentially a group of smaller innovative companies that can leverage their collective knowledge may be able to compete with larger companies as they may have more collective data. The value of the models and software flow become very sticky and would not be transferrable to other EDA flows. As such, the models may create value over time that would attract more contributors.

Embodiments of distributed machine learning electronic design process 10 provide a new architecture for managing on-premise and cloud-based (e.g. using networks 14, 18, etc. of FIG. 1) use of distributed learning and model development that safely secures local IP at each individual company's sites. Embodiments included herein allow for wide-scale model parallelism to capture aggregate design practices that promote better yields, reliability and performance. As such, embodiments of distributed machine learning electronic design process 10 may allow for the construction of IC, package, and board meta-models that create significant value as a cloud-based methodology.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for collaborative electronic design comprising:
   receiving a baseline model at a computing device associated with each of a plurality of geographically dispersed electronic design teams;
   applying environmental data from each of the plurality of geographically dispersed electronic design teams to the baseline model;
   generating a plurality of training changes, based upon, at least in part, the applied environmental data from each of the plurality of geographically dispersed electronic design teams;
   encrypting the plurality of training changes to create a plurality of encrypted training changes; and
   providing the plurality of encrypted training changes to a centralized host configured to aggregate the plurality of encrypted training changes.

2. The computer-implemented method of claim 1, wherein the centralized host is configured to obscure the plurality of encrypted training changes.

3. The computer-implemented method of claim 1, wherein providing the plurality of encrypted training changes to the centralized host is performed without sending design data, design preferences or design analyses from the plurality of geographically dispersed electronic design teams.

4. The computer-implemented method of claim 1, further comprising:
   generating an updated model at the centralized host, based upon, at least in part, the plurality of encrypted training changes.

5. The computer-implemented method of claim 4, further comprising:
   providing, from the centralized host, the updated model to each of the plurality of geographically dispersed electronic design teams.

6. The computer-implemented method of claim 1, wherein the environmental data includes one or more of simulation data, floorplanning data, placement data, routing data, finishing data, checking data, and verification data.

7. The computer-implemented method of claim 1, wherein generating the plurality of training changes includes generating one or more error gradients.

8. A computer-readable storage medium for collaborative electronic design, the computer-readable storage medium having stored thereon instructions that when executed by a machine result in one or more operations, the operations comprising:
   receiving a baseline model at a computing device associated with each of a plurality of geographically dispersed electronic design teams;
   applying environmental data from each of the plurality of geographically dispersed electronic design teams to the baseline model;
   generating a plurality of training changes, based upon, at least in part, the applied environmental data from each of the plurality of geographically dispersed electronic design teams;
   encrypting the plurality of training changes to create a plurality of encrypted training changes; and
   providing the plurality of encrypted training changes to a centralized host configured to aggregate the plurality of encrypted training changes.

9. The computer-readable storage medium of claim 8, wherein the centralized host is configured to obscure the plurality of encrypted training changes.

10. The computer-readable storage medium of claim 8, wherein providing the plurality of encrypted training changes to the centralized host is performed without sending design data, design preferences or design analyses from the plurality of geographically dispersed electronic design teams.

11. The computer-readable storage medium of claim 8, further comprising:
    generating an updated model at the centralized host, based upon, at least in part, the plurality of encrypted training changes.

12. The computer-readable storage medium of claim 11, further comprising:
    providing, from the centralized host, the updated model to each of the plurality of geographically dispersed electronic design teams.

13. The computer-readable storage medium of claim 8, wherein the environmental data includes one or more of simulation data, floorplanning data, placement data, routing data, finishing data, checking data, and verification data.

14. The computer-readable storage medium of claim 8, wherein generating the plurality of training changes includes generating one or more error gradients.

15. A system for collaborative electronic design comprising:
    one or more processors configured to receive a baseline model at a computing device associated with each of a plurality of geographically dispersed electronic design teams, the one or more processors configured to apply environmental data from each of the plurality of geographically dispersed electronic design teams to the baseline model, the one or more processors further configured to generate a plurality of training changes, based upon, at least in part, the applied environmental data from each of the plurality of geographically dispersed electronic design teams, the one or more processors further configured to encrypt the plurality of training changes to create a plurality of encrypted training changes; and
    a centralized host configured to receive the plurality of encrypted training changes and to aggregate the plurality of encrypted training changes.

16. The system for collaborative electronic design of claim 15, wherein the centralized host is configured to obscure the plurality of encrypted training changes.

17. The system for collaborative electronic design of claim 15, wherein providing the plurality of encrypted training changes to the centralized host is performed without sending design data, design preferences or design analyses from the plurality of geographically dispersed electronic design teams.

18. The system for collaborative electronic design of claim 15, further comprising:
    generating an updated model at the centralized host, based upon, at least in part, the plurality of encrypted training changes.

19. The system for collaborative electronic design of claim 18, further comprising:
    providing, from the centralized host, the updated model to each of the plurality of geographically dispersed electronic design teams.

20. The system for collaborative electronic design of claim 15, wherein the environmental data includes one or more of simulation data, floorplanning data, placement data, routing data, finishing data, checking data, and verification data.

* * * * *